(12) United States Patent
Oishi

(10) Patent No.: US 6,457,702 B1
(45) Date of Patent: Oct. 1, 2002

(54) ANNULAR BELLOWS UNIT FOR VEHICLE SUSPENSION

(76) Inventor: Yuzuru Oishi, 2610 Fontezuela Dr., Hacienda Hts., CA (US) 91745

( * ) Notice: Subject to any disclaimer, the term of this patent is extended or adjusted under 35 U.S.C. 154(b) by 0 days.

(21) Appl. No.: 09/976,528

(22) Filed: Oct. 9, 2001

Related U.S. Application Data

(63) Continuation-in-part of application No. 09/823,567, filed on Mar. 30, 2001, now Pat. No. 6,332,602.

(51) Int. Cl.[7] ................................................. F16F 9/04
(52) U.S. Cl. ........................ 267/122; 267/118; 267/119
(58) Field of Search ........................... 267/64.19, 64.21, 267/64.27, 64.24, 116, 118, 121, 123, 130, 151, 152; 248/562, 566, 636

(56) References Cited

U.S. PATENT DOCUMENTS

| 1,382,081 A | 6/1921 | Heiliger | |
| 1,909,890 A | 5/1933 | Phillips | |
| 2,711,315 A | 6/1955 | Mosebach | |
| 2,828,769 A | 4/1958 | Cooper | |
| 2,943,577 A | 7/1960 | Barker | |
| 4,854,555 A | 8/1989 | Ohkawa et al. | ........... 267/64.24 |
| 4,860,571 A | 8/1989 | Smedberg et al. | ........... 267/119 |
| 4,921,227 A | 5/1990 | Fukumura et al. | ....... 267/64.23 |
| 5,042,781 A | 8/1991 | Ezure et al. | ............. 267/64.23 |

Primary Examiner—Christopher P. Schwartz
(74) Attorney, Agent, or Firm—Sheldon & Mak

(57) ABSTRACT

An annular bellows unit for replacing a vehicle suspension coil spring that encloses a shock absorber or hydraulic actuator includes annular second flange members that are sealingly connected at opposite ends of respective inner and outer bellows members to form a closed chamber, and a fill port in one of the flange members for pressurizing the chamber.

15 Claims, 6 Drawing Sheets

ANNULAR BELLOWS UNIT FOR VEHICLE SUSPENSION

RELATED APPLICATION

This application is a continuation-in-part of application Ser. No. 09/823,567, filed on Mar. 30, 2001, now U.S. Pat. No. 6,332,602, which is incorporated herein by this reference.

BACKGROUND

The present invention relates to vehicle suspensions, and more particularly to biasing elements for, and aftermarket conversions of, such suspensions.

Many types of vehicle suspension arrangements are well known. In recent years, it has become common to provide coil springs as biasing elements, with damping elements, commonly known as shock absorbers, connected between frame or unibody portions of the vehicle and suspension elements such as axle housings and pivotable arm members. In many cases, telescopic shock absorbers are mounted generally concentrically with coil springs. An examplary configuration has a spindle mount pivotally connected between upper and lower A-arms, a coil spring and coaxial shock absorber being interposed between the lower A-arm and a fixed point on the chassis. Another such configuration, known as the McPherson system, having a short axle housing or spindle rigidly connected at a bottom extremity of a shock absorber, a top extremity of the shock absorber being pivotally mounted to the vehicle chassis. A pivoting linkage locates the shock absorber bottom extremity and (for front suspensions, a suitable steering linkage) rotationaly orients the bottom extremity relative to a longitudinal axis of the shock absorber, a camber alignment of the suspension being maintained by the rigid connection of the axle housing or mount to the shock absorber. In this configuration, the unitary combination of the shock absorber, spring, and spindle or axle housing is known as a "McPherson strut".

In a significant number of cases, it is desired to change the ride height of the vehicle or other characteristics of the suspension. Accordingly, it has been common to substitute different springs and/or suspension components having different geometry. Also, increased ride height is sometimes achieved by inserting spacers between springs and connected suspension components.

A recent development is air suspension, wherein pressurized bellows are substituted for coil springs. However, the pressurized bellows of the prior art are incompatible with concentric mounting of shock absorbers. Another recent development is shock absorbers that are configured for receiving pressure air for selectively increased ride height, the pressure air augmenting conventional springs. A further development is hydraulic actuators that are substituted for conventional shock absorbers, the actuators being operable for changing the ride height. In typical "low-rider" applications, a downwardly extending piston rod of a hydraulic actuator connects to a lower suspension A-arm in place of a conventional shock absorber, an oppositely extending cylinder body being connected through a cut-down portion of the original coil spring to the vehicle chassis. An electrically driven pump feeds the single-acting actuator to change the ride height in response to operator input. A principal disadvantage of the low-rider actuators of the prior art is that they produce a particularly harsh ride with substantially no spring action because only about half of the original spring is utilized.

Thus there is a need for an adjustable vehicle suspension biasing element that is compatible with concentric shock absorber mounting and otherwise overcomes disadvantages of the prior art.

SUMMARY

The present invention meets this need by providing an annular bellows unit that is particularly effective for use as an aftermarket vehicle suspension biasing element to replace a coil spring interposed between upper and lower spring mounts, the suspension also having a telescopic shock absorber or other element connected relative to the upper and lower spring mounts. In one aspect of the invention, the bellows unit includes an outer bellows having first and second ends; an annular first flange member sealingly connected at the first end of the outer bellows; an annular second flange member sealingly connected at the second end of the outer bellows; an inner bellows sealingly connected between the first and second flange members within the outer bellows member, a closed chamber being formed between the outer and inner bellows; and a fill passage extending through the second flange member in fluid communication with the chamber and having a fill port for pressurizing the chamber. Accordingly, a clearance passage for the telescopic element extends through the inner bellows and the annular flange members. One end of the inner bellows can encloses a portion of one of the flange members, an inner clamp ring clamping the end of the inner bellows to that flange member, which can also have a depression formed therein for engaging an inwardly extending projection that is formed on the one end of the inner bellows. The inwardly extending projection of the inner bellows can be ring-shaped, and the depression formed in the corresponding flange member can include a circular groove. Also, the inner bellows can have an inner bead-reinforcing ring aligned with the inwardly extending projection for reinforcing the inner bellows between the inner clamp ring and the circular groove.

One end of the outer bellows can encloses a portion of a corresponding flange member, the bellows unit also having an outer clamp ring clamping the outer bellows end to that flange member. The one end of the outer bellows can have an inwardly extending projection, and the corresponding flange member can have a depression formed therein for receiving by the projection. Alternatively, the depression can include a peripheral groove, and the outer clamp ring can deform a ring-shaped portion of the outer bellows into the groove.

The inner bellows can include a plurality of bellows segments having facing tapered elements that are joined at their outer peripheral extremities, with adjacent segments being joined between facing inner peripheral extremities of adjacent elements, respective outside reinforcing rings being connected proximate the facing outer peripheral extremities of corresponding bellows segments for reinforcing the segments against outside air pressure. The inner bellows can also have inside reinforcing rings that are connected proximate the facing inner peripheral extremities of adjacent segment elements.

In one preferred variation of the bellows unit, one of the flange members includes an outer flange and an axially separable inner flange, and the inner bellows has an outwardly projecting bellows flange portion, the bellows flange portion being sealingly clamped between the outer and inner flange portions. At least one of the outer and inner flange portions can have an axially facing depression formed therein, the bellows flange portion having an axially projecting enlargement that engages the axially facing depression.

In another preferred variation, the bellows unit also includes a tubular mandrel, and the inner bellows includes a facing pair of bellows elements and a neck portion that is joined between inner peripheral extremities of the bellows elements. The neck portion is reinforced by the mandrel, the bellows elements tapering axially inwardly toward opposite ends of the neck portion in an extended condition of the bellows unit. In a compressed condition of the bellows unit the bellows elements taper axially outwardly toward the ends of the neck portion. Thus the bellows elements undergo axial inversion when the bellows unit moves from the extended condition to the compressed condition, thereby facilitating an enhanced travel range of the bellows unit.

At least one end portion of the inner bellows can enclose an axially projecting extension portion of a corresponding flange member, an associated bellows element being folded inside the end portion of the inner bellows, projecting within the extension portion in the compressed condition of the bellows unit. Preferably the inner bellows is formed with respective flex regions at opposite extremities of each of the bellows elements, thereby facilitating movement between the extended and compressed conditions of the bellows unit.

DRAWINGS

These and other features, aspects, and advantages of the present invention will become better understood with reference to the following description, appended claims, and accompanying drawings, where:

FIG. 8 is another sectional view as in FIG. 5, showing a fully compressed condition of the apparatus.

DESCRIPTION

Figure 1:
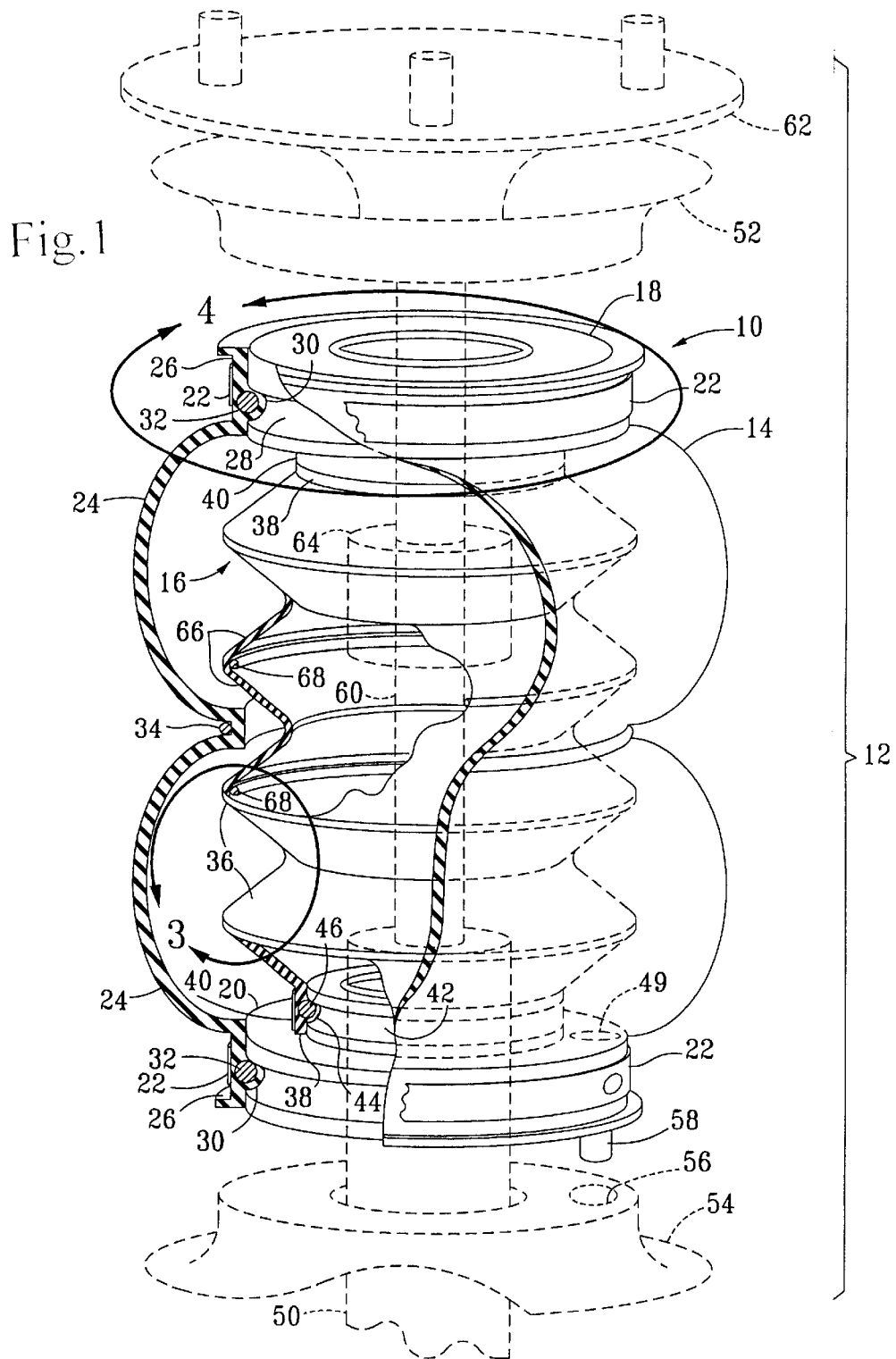
FIG. 1 is a fragmentary sectional perspective view of an annular bellows apparatus substituted for a coil spring of a vehicle suspension according to the present invention, the bellows apparatus being in an extended condition.
Figure 2:
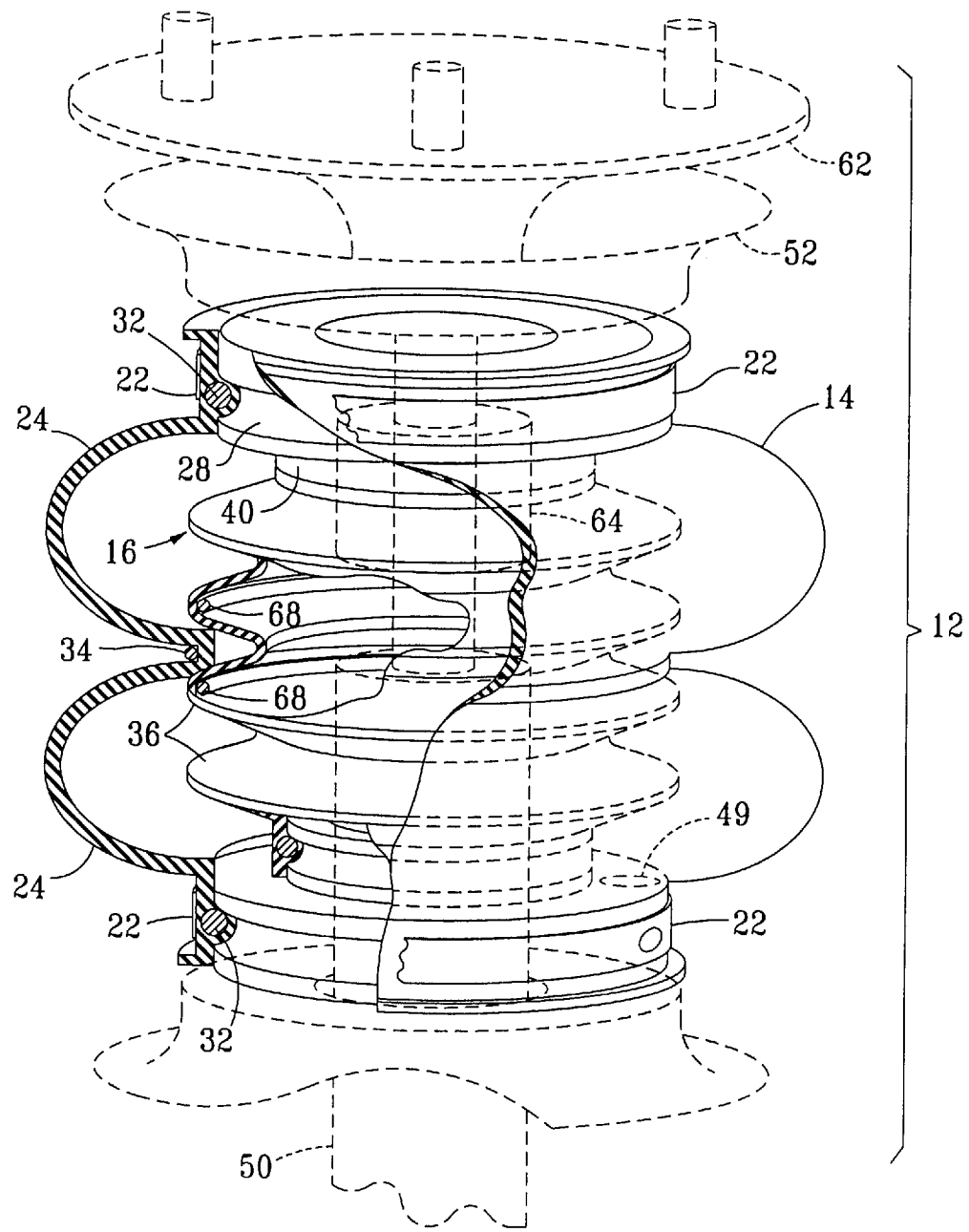
FIG. 2 is a perspective view as in FIG. 1, showing the bellows apparatus in a compressed condition.

The present invention is directed to an annular bellows unit that is particularly effective as an aftermarket vehicle suspension biasing element. With reference to FIGS. 1 and 2 of the drawings, an annular bellows apparatus 10 for a vehicle suspension 12 includes an outer bellows 14 an inner bellows 16, an upper flange member 18, and a lower flange member 20. Opposite ends of the outer bellows 14 are sealingly clamped onto outer extremities of the upper and lower flange members 18 and 20 by respective outer clamp rings 22. The outer bellows 14 has a plurality of outer bellows segments 24, and generally cylindrical outer extensions 26 being formed at the opposite ends for receiving the clamp rings 22. The upper and lower flange members 18 and 20 have circular outer groove depressions 28 formed therein for receiving respective outer beads 30 that project inwardly from insides of the outer extensions 26. Also, each of the outer beads 30 is reinforced by an outer bead ring 32, and an additional reinforcing ring, designated outer reinforcing ring 34, is located between adjacent ones of the outer bellows segments 24 for preventing outward expansion of the bellows segments 24 when the bellows apparatus 10 is pressurized as described below. The outer bellows 24 is typically a composite-molded part, the outer bead rings and the outer reinforcing ring being encapsulated within a resilient polymer. The outer bellows segments 24 are arch-shaped in longitudinal cross-section, opposite ends of each segment being inwardly tapered elements, the elements being joined at outer extremities thereof. The outer bellows 24 as described above is used in commercially available air suspension devices, known as "air springs", from Goodyear Tire & Rubber Co. of Green, Ohio. The outer clamp rings 22 can be adjustable, reusable clamps or, alternatively, crimped-on rings such as are used in the Goodyear air springs.

In the exemplary configuration of the annular bellows apparatus 10, the inner bellows 16 is a generally smaller diameter counterpart of the outer bellows 14. However, the inner bellows 16 is configured for withstanding outside air pressure as contrasted with the outer bellows 14 being configured to withstand inside pressure. More particularly, the inner bellows 14 has a plurality of inner bellows segments 36, with inner extensions 38 being formed at opposite ends for receiving respective inner clamp rings 40 by which the inner bellows 16 is sealingly clamped to the upper and lower flange members 18 and 20 in a manner similar to the outer bellows 14, the upper and lower flanges 18 and 20 having inwardly facing portions of reduced diameter that have respective inner groove depressions 42 formed therein for receiving corresponding inner beads 44 that project inwardly from the inner extensions 38. The inner beads 44 are reinforced by respective inner bead rings 46, the sealed connections of the outer bellows 14 and the inner bellows 16 with the upper and lower flanged 18 and 20 being similarly configured.

Thus, a sealed annular chamber 48 is formed between the outer bellows 14 and the inner bellows 16 according to the present invention, while preserving the annular configuration of the bellows apparatus 10, a fill port 49 being provided in the lower flange member 20 for pressurizing the chamber 48. Thus the bellows apparatus 10 can be combined with a generally concentric shock absorber 50 in the vehicle suspension 12 as shown in FIG. 1 wherein the apparatus 10 is in an extended condition, and FIG. 2, wherein the apparatus in a compressed condition. More particularly, the bellows apparatus 10 is interposed between a top coil flange 52, and a bottom coil flange 54 of the suspension 12, a coil spring formerly biasing apart the coil flanges 52 and 54 having been removed. If necessary, a clearance opening 56 is formed in the bottom coil flange 54 for receiving a valve fitting 58 that projects from the fill port 49, the valve fitting 58 being in fluid communication with the cavity 48. The shock absorber 50 is conventionally mounted, projecting through the coil flanges 52 and 54, as well as through the annular bellows apparatus 10 of the present invention. An extension rod 60 of the shock absorber 50 is connected to a stud plate 62 of the vehicle suspension 12 in a conventional manner by a rubber bushing and bearing (not shown). It will be understood that the shock absorber 50 can form a portion of a strut assembly that conventionally includes a helical coil spring, the bellows apparatus 10 being substituted for the spring. Preferably a resilient annular bumper member 64 is assembled onto the extension rod 62 for cushioning the vehicle suspension 12 in case of loss of pressure from the chamber 48 of the bellows apparatus 10.

In the exemplary configuration shown in FIGS. 1 and 2, the inner bellows segments 36 each taper inwardly at opposite ends thereof, having oppositely facing elements 66 that are integrally formed and joined at outer peripheral extremities thereof. Preferably, in configurations of the inner bellows 16 formed primarily of a relatively soft material, the inner bellows segments 36 are each reinforced by an outside reinforcing ring 68, the ring 68 being encapsulated or otherwise connected for preventing contraction of outer peripheral extremities of the segments 36.

Figure 3:
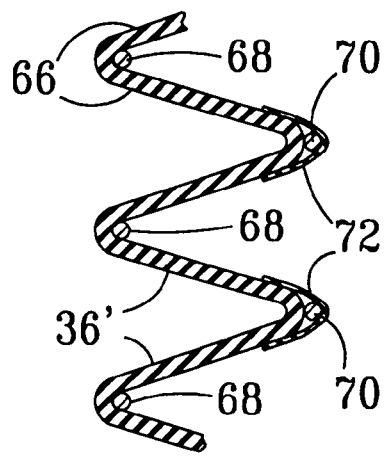
FIG. 3 is a fragmentary sectional view within region 3 of FIG. 1, showing an alternative configuration of the annular bellows.

With further reference to FIG. 3, an alternative configuration of the annular bellows apparatus 10 has a counterpart of the inner bellows, designated 16', including a plurality of inside reinforcing rings 70 located and connected at inner peripheral extremities of adjacent inner bellows segments 36' for preventing contraction thereof, the rings 70 being retained in place by respective inner web portions 72 of the bellows 16'. It will be understood that the inner reinforcing rings can be retained by any suitable means, such as by encapsulation within material of the bellows 16', and by spaced pluralities of strands that are anchored in the bellows segments 36'.

Figure 4:
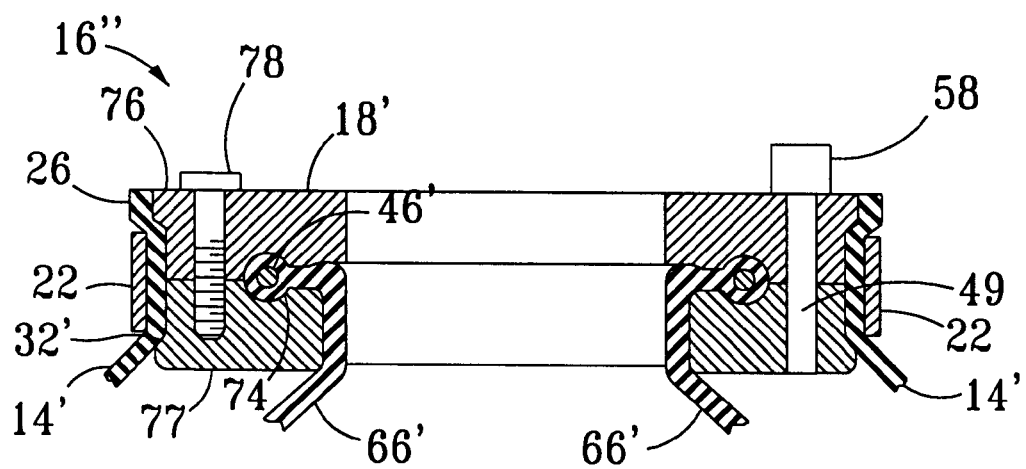
FIG. 4 is a fragmentary sectional view within region 4 of FIG. 1, showing another alternative configuration of the annular bellows.

With further reference to FIG. 4, another alternative configuration of the inner bellows, designated 16", has an outwardly projecting bead flange 74 joined to a counterpart of the inner extension 38, a counterpart of the inner bead ring, designated 46', being encapsulated within the bead flange 74. An axially split counterpart of the upper flange member, designated 18', includes an outer flange 76 and an inner flange 77, the flanges 76 and 77 being clamped on opposite sides of the bead flange 74 by a plurality of clamp fasteners 78. Optionally, *. A counterpart of the outer bellows, designated 14', is sealingly connected to the upper flange 18', which is formed with a shallow counterpart of the groove depression, designated 32', to have the outer extension 26 of the outer bellows 14' sealingly clamped thereto, the extension 26 being formed without the outer bead ring and the outer reinforcing ring that is included in the bellows 14 of FIGS. 1 and 2. As further shown in FIG. 4, the upper flange 18' can be provided with a counterpart of the fill port 49 for receiving the valve fitting 58, it being understood that counterparts of the fill port 49 can be provided at either or both ends of the bellows apparatus 10, in which case a suitable plug (not shown) would be used at one end en place of the fitting 58. It will be further understood that the bellows apparatus 10 can be configured with any combination of the features of FIGS. 1–4.

As described above, the bellows apparatus 10 can be used to replace a coil spring in a vehicle suspension having a shock absorber that is mounted generally concentrically with the previous location of the spring, whether or not the spring and shock absorber originally formed portions of a McPherson-type strut. Similarly, the bellows apparatus 10 can be used in combination with a low-rider hydraulic actuator, replacing an original spring that would otherwise have to be shortened. A suitable ring member couples the bottom of the bellows apparatus 10 to a cylinder body of the actuator, the ring member resting on a shoulder that is formed by a lower enlargement of the cylinder body.

With further reference to FIGS. 5–8, an alternative configuration of the annular bellows apparatus, designated 10', has a counterpart of the inner bellows, designated 80, that is assembled onto a cylindrical mandrel 82. The inner bellows 80 has a central neck portion 84 that is axially secured on the mandrel 82 by a mandrel clamp 86. Respective counterparts of the upper and lower flanges, designated 18' and 20', are formed having axially projecting extension portions 88, respective inner extensions 38 that are formed at opposite ends of the inner bellows 80 being clamped onto the extension portions 88 by counterparts of the inner clamp rings 40 as described above, the inner extensions 38 being compressed into respective inner groove depressions 42 that are formed in the extension portions 88 as also described above. The inner bellows 80 also has respective bellows elements, designated 66', that flexibly connect the inner extensions 38 to the neck portion 83, the elements 66' moving from the orientations shown in FIG. 5 to respective inverted orientations shown in FIG. 8 when the bellows apparatus 10' moves from an extended condition shown in FIG. 5 to a full compressed condition shown in FIG. 8. The mandrel 82 prevents the neck portion 84 from contracting when the annular chamber 48 is pressurized and over a full range of movement between the extended and compressed conditions of the apparatus 10'. This configuration of the inner bellows 80 advantageously facilitates an extended travel range of the bellows unit 10' between the extended and compressed conditions thereof.

Figure 6:
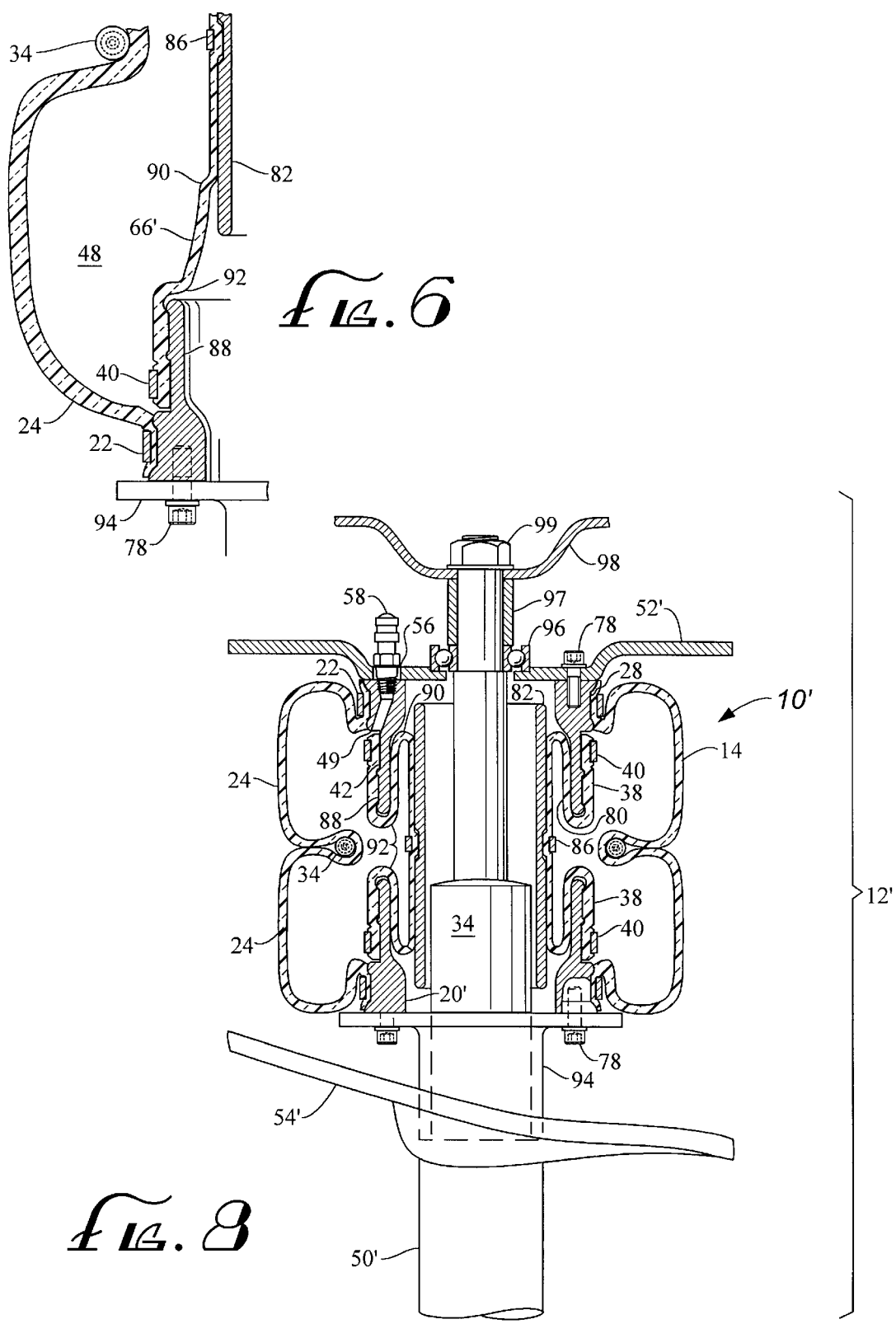
FIG. 6 is a detail sectional view within region 6 of FIG. 5, depicting the presence of gas pressure within the apparatus.
Figure 7:
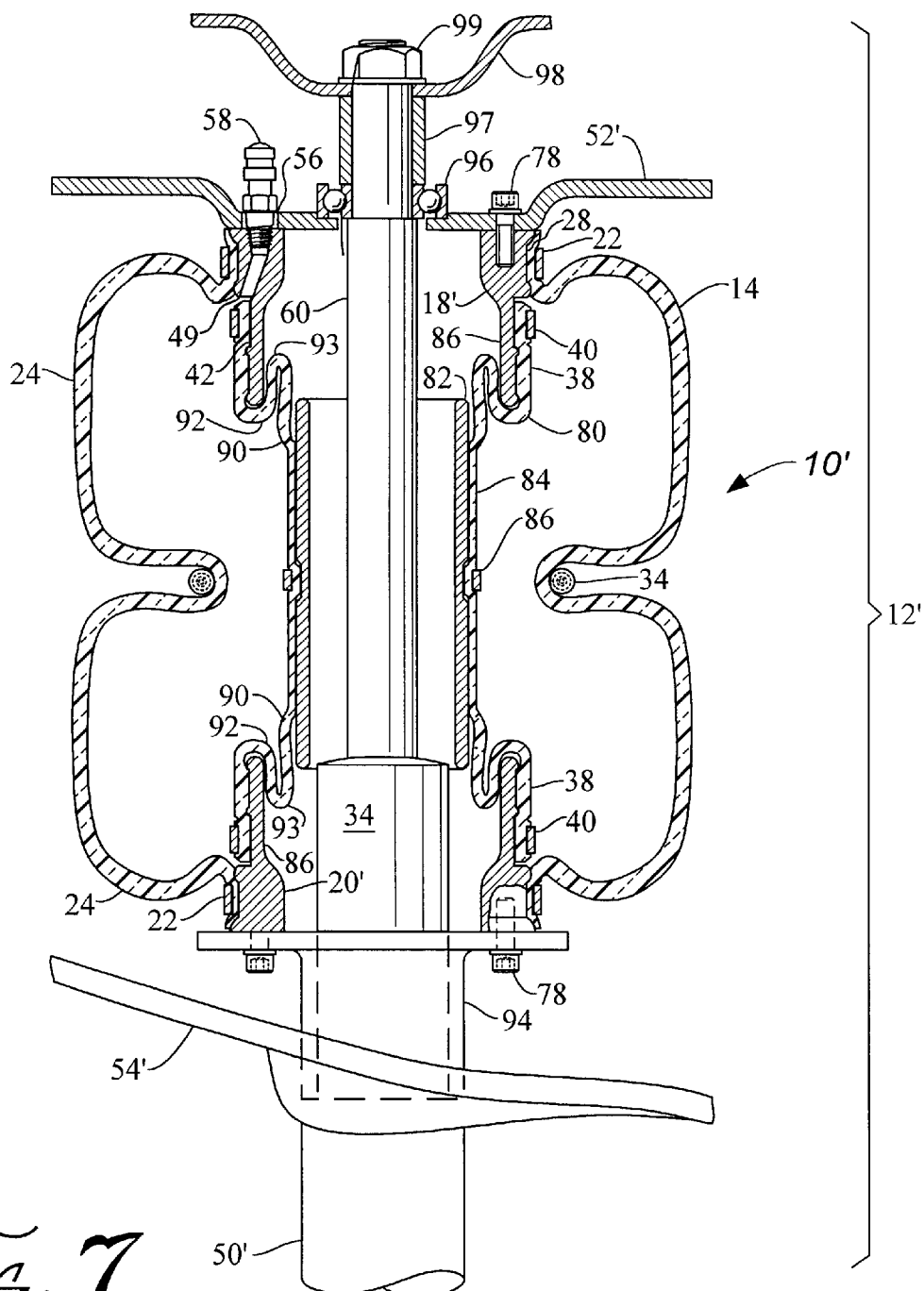
FIG. 7 is a sectional view as in FIG. 5, showing the apparatus of FIG. 5 in a partially compressed condition.

As shown in FIG. 6, pressurization of the annular chamber 48, such as by admitting pressure air through the valve fitting 58, produces some radial deflection of the bellows elements 66', FIG. 6 depicting the extended condition of the apparatus 10' with an initial or base pressurization of the chamber 48. FIG. 7 shows the apparatus 10 in a partially compressed condition at increased pressurization of the chamber 48, wherein the bellows elements 66' are deflected to a partially inverted orientation, the inner bellows 80 flexing primarily at inner and outer extremities of the bellows elements 66', respectively designated inner flex region 90 and outer flex region 92. Maximum pressure is produced in the fully compressed condition of FIG. 8, the bellows elements 66' being folded into an inverted orientation within the extension portions 88 of the upper and lower flanges 18' and 20'.

Figure 5:
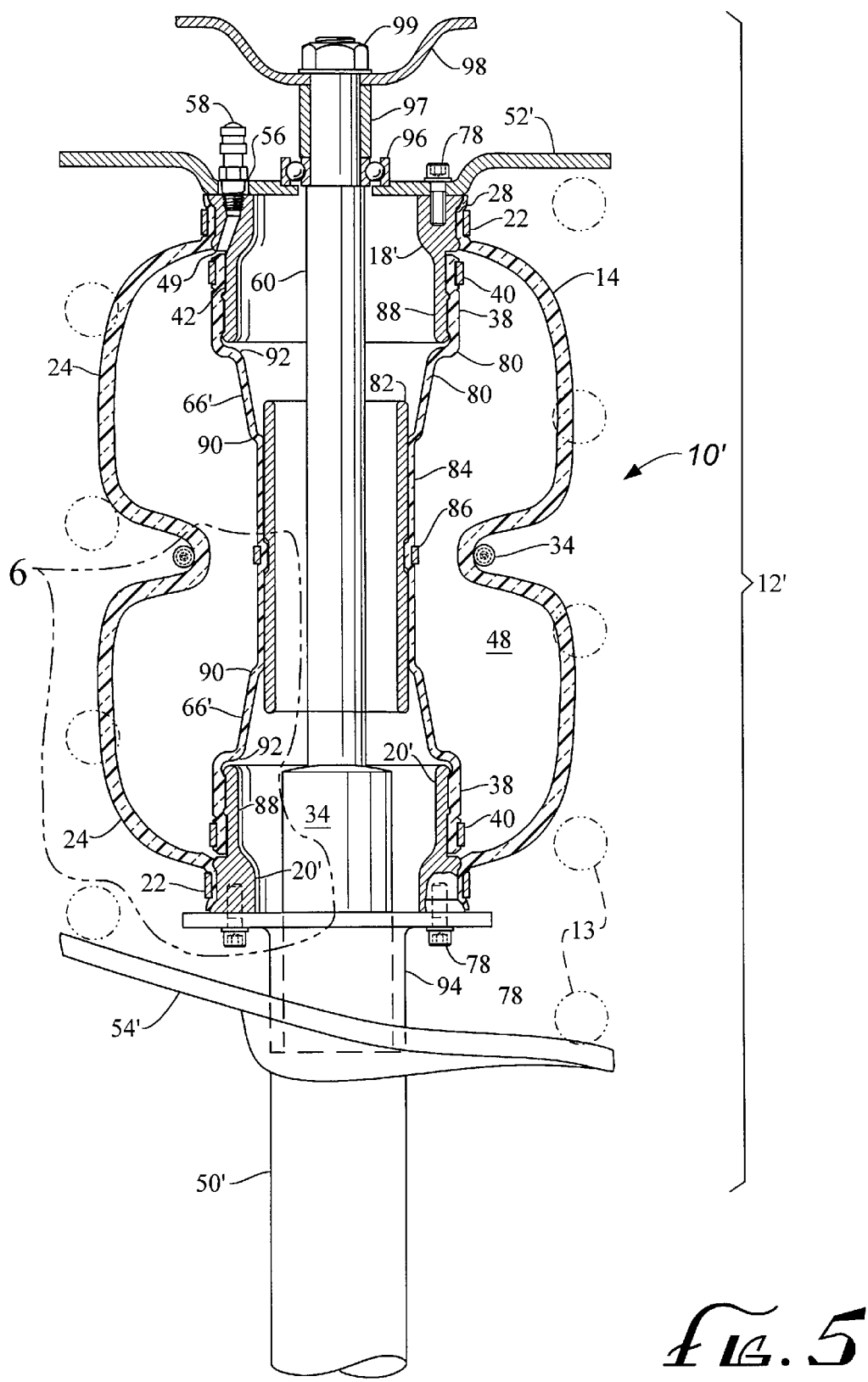
FIG. 5 is a fragmentary sectional side view showing an alternative configuration of the bellows apparatus of FIG. 1.

The bellows apparatus 10' is typically used in conjunction with an existing vehicle suspension, designated 12' in FIG. 5 and including a shock absorber or strut 50' having a counterpart of the bottom coil flange, designated 54', the flange 54' formerly supporting a conventional coil spring 13. An adapter flange 94 is assembled onto the strut 50' above the bottom coil flange 54', the lower flange member 20' of the annular bellows apparatus 10' being fastened thereto by counterparts of the clamp fasteners 78. Similarly, a top coil flange 52' is fastened to the upper flange member 18' by further fasteners 78, the top coil flange having the clearance opening 56 for the valve fitting 58, the fill port 49 being formed in the upper flange member 18'. The top coil flange 52' supports a thrust bearing 96 that is assembled onto the extension rod 60 of the strut 50' along with a spacer sleeve 97, the sleeve abutting a counterpart of the stud plate that forms a stationary portion of a vehicle chassis, designated mounting flange 98. The upper extremity of the extension rod 60 is threaded, being secured to the flange 98 by a threaded nut 99.

Although the present invention has been described in considerable detail with reference to certain preferred versions thereof, other versions are possible. For example, the outer bellows 14, the inner bellows 16, and the upper flange member 18 can be integrally formed. As indicated above, the apparatus 10 can be inverted for locating the fill port 49 at the top or the bottom. Also, the flange members 18 and 20 in the configuration of FIGS. 1–4 can be flexible, so long as the abutting coil flange 52 or 54 (or corresponding member) provides suitably distributed support. Further, the outer bellows 14 can be configured in a manner corresponding to the inner bellows 80 of FIGS. 5–8, being confined within an enlarged counterpart of the mandrel 82. Therefore, the spirit and scope of the append claims should not necessarily be limited to the description of the preferred versions contained herein.

What is claimed is:

1. An annular bellows unit for converting a vehicle suspension having a coil spring enclosing a telescopic element, the bellows unit comprising:
   (a) an outer bellows having first and second ends;
   (b) an annular first flange member sealingly connected at the first end of the outer bellows;
   (c) an annular second flange member sealingly connected at the second end of the outer bellows;
   (d) an inner bellows sealingly connected between the first and second flange members within the outer bellows member, a closed chamber being formed between the outer and inner bellows;
   (e) a fill passage extending through the second flange member in fluid communication with the chamber and having a fill port for pressurizing the chamber; and
   (f) a tubular mandrel,
   wherein the inner bellows comprises a facing pair of bellows elements and a neck portion joined at inner peripheral extremities of the bellows elements, the neck portion being reinforced by the mandrel, the bellows elements tapering axially inwardly toward opposite ends of the neck portion in an extended condition of the bellows unit and tapering axially outwardly toward the ends of the neck portion in a compressed condition of the bellows unit.

2. The bellows unit of claims 1 wherein at least one end of the inner bellows encloses a portion of a corresponding one of the first and second flange members, the bellows unit further comprising an inner clamp ring for clamping the at least one end of the inner bellows to the corresponding flange member.

3. The bellows unit of claim 2, wherein the at least one end of the inner bellows has an inwardly extending projection, and the corresponding flange member has a depression formed therein for engagement by the projection.

4. The bellows unit of claim 3, wherein the inwardly extending projection of the inner bellows is ring-shaped and the depression formed in the corresponding flange member comprises a circular groove.

5. The bellows unit of claim 4, further comprising an inner bead-reinforcing ring located proximate the at least one end of the inner bellows in alignment with the inwardly extending projection for reinforcing the inner bellows between the inner clamp ring and the circular groove.

6. The bellows unit of claim 2, wherein the corresponding flange member has a groove formed therein, the inner clamp ring deforming a ring-shaped portion of the inner bellows into the groove.

7. The bellows unit of claim 1, wherein at least one end of the outer bellows encloses a portion of a corresponding one of the first and second flange members, the bellows unit further comprising an outer clamp ring for clamping the at least one end of the outer bellows to the corresponding flange member.

8. The bellows unit of claim 7, wherein the at least one end of the outer bellows has an inwardly extending projection, and the corresponding flange member has a depression formed therein for engagement by the projection.

9. The bellows unit of claim 7, wherein the corresponding one of the first and second flange members has a groove formed therein, the outer clamp ring deforming a ring-shaped portion of the outer bellows into the groove.

10. The apparatus of claim 1, wherein at least one end portion of the inner bellows encloses an axially projecting extension portion of a corresponding one of the first and second flange members, a corresponding one of the bellows elements being folded inside the end portion and projecting within the extension portion in the compressed condition of the bellows unit.

11. The bellows unit of claim 1, wherein the inner bellows is formed with respective flex regions at opposite extremities of each of the bellows elements.

12. An annular bellows unit for converting a vehicle suspension having a coil spring enclosing a telescopic element, the bellows unit comprising:
    (a) annular first and second flange members, the first and second flange members each comprising an outer flange portion and an axially projecting extension portion;
    (b) an inner bellows comprising:
        (i) a facing pair of bellows elements;
        (ii) a neck portion joined at inner peripheral extremities of the bellows elements;
        (iii) respective flex regions being formed at opposite extremities of each of the bellows elements;
        (iv) opposite tubular end portions of the inner bellows projecting axially from respective ones of the bellows elements;
    (c) a tubular mandrel reinforcing the neck portion of the inner bellows;
    (d) the end portions of the inner bellows sealingly engaging the first and second flanges on outside surfaces of respective extension portions thereof;
    (e) an outer bellows having axially extending tubular end portions, the end portions sealingly engaging respective outer flange portions of the first and second flange members, a closed chamber being formed between the outer and inner bellows; and
    (f) a fill passage extending through the second flange member in fluid communication with the chamber and having a fill port for pressurizing the chamber,
        wherein the bellows elements extend axially inwardly toward opposite ends of the neck portion in an extended condition of the bellows unit and extend axially outwardly toward the ends of the neck portion in a compressed condition of the bellows unit, the bellows elements being folded inside the end portions of the inner bellows, projecting within respective extension portions of the flange members in the compressed condition of the bellows unit.

13. The bellows unit of claims 12, wherein the outer and extension portions of the first and second flange members have respective depressions formed therein, the bellows unit further comprising respective pairs of inner and outer clamp rings, the inner clamp rings clamping the end portions of the inner bellows onto the flange member extension portions and deforming ring-shaped portions of the inner bellows into the depressions thereof, the outer clamp rings clamping the end portions of the outer bellows onto the outer flange portions and deforming ring-shaped portions of the outer bellows into the depressions thereof.

14. An annular bellows unit for converting a vehicle suspension having a coil spring enclosing a telescopic element, the bellows unit comprising:

(a) annular first and second flange members, the first and second flange members each comprising an outer flange and an axially separable inner flange;

(b) an inner bellows comprising:

(i) a plurality of bellows segments, each of the bellows segments having facing tapered elements joined at outer peripheral extremities thereof, adjacent segments being joined between between facing inner peripheral extremities of adjacent elements, the inner bellows further comprising a plurality of outside reinforcing rings, each of the outside reinforcing rings being connected proximate the facing outer peripheral extremities of a respective bellows segment; and (ii) first and second outwardly projecting bellows flange portions being formed on respective opposite ends of the inner bellows;

(c) a plurality of clamp fasteners for sealingly clamping the inner and outer flanges of the first and second flange members on opposite sides of respective ones of the bellows flange portions of the inner bellows;

(d) an outer bellows having axially extending tubular end portions, the end portions enclosing respective portions of corresponding ones of the first and second flange members:

(e) first and second outer clamp rings on respective end portions of the outer bellows for sealingly connecting the outer bellows to the first and second flange members, a closed chamber being formed between the outer and inner bellows; and (f) a fill passage extending through the second flange member in fluid communication with the chamber and having fill port for pressurizing the chamber.

15. The bellows unit of claim 14, wherein at least one of the outer and inner flange portions of the first and second flange members have respective axially facing depressions formed therein and the first and second bellows flange portions have respective axially projecting enlargement, the enlargement of the bellows flange portions engaging corresponding ones of the axially facing depressions.

* * * * *